Sept. 8, 1964
W. A. CRESSWELL, JR
3,147,915
CALCULATOR
Filed March 21, 1962
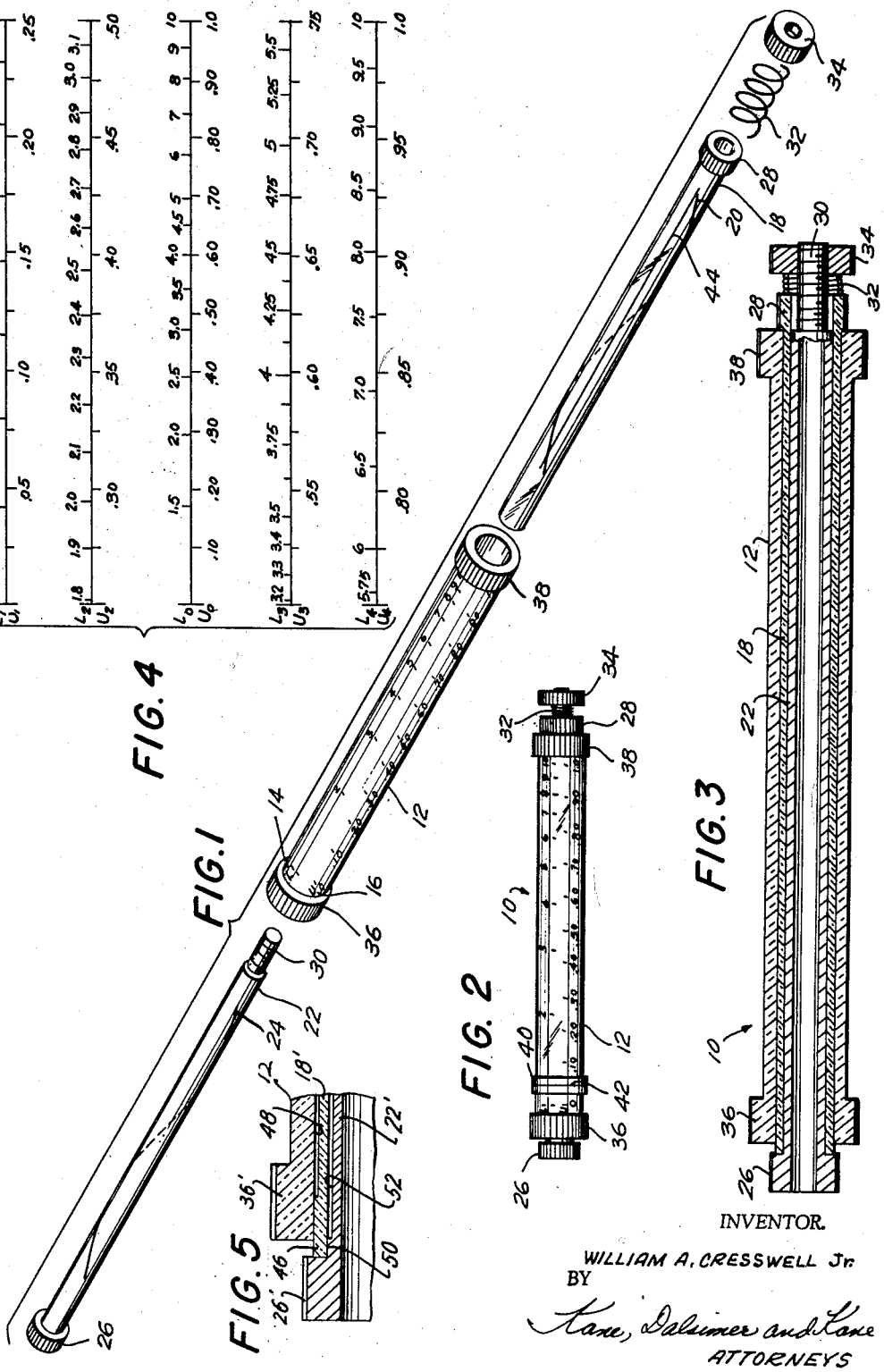
INVENTOR.
WILLIAM A. CRESSWELL Jr.
BY
Kane, Dalsimer and Kane
ATTORNEYS

United States Patent Office 3,147,915
Patented Sept. 8, 1964

3,147,915
CALCULATOR
William A. Cresswell, Jr., Huntington Road,
Huntington, N.Y.
Filed Mar. 21, 1962, Ser. No. 181,269
8 Claims. (Cl. 235—79.5)

The present invention relates to a calculator which is of simple construction and which is relatively simple to operate.

Calculating devices such as slide rules are constructed in various forms, namely, rectilineal, circular and cylindrical. They function to give a rapid determination of mathematical problems, and the length of the scales used determines the accuracy obtainable by the operator.

The usual mathematical functions obtainable with the use of a slide rule are the following: multiplication, division, logarithmic functions, trigonometric functions, powers and roots of powers. However, no scales are generally provided to perform the functions of addition and subtraction.

It is therefore an object of my invention to provide a calculating device that contains scales from which the operator may add or subtract in addition to scales to perform the usual mathematical functions of any other slide rule.

Another object of my invention is to provide a calculating device which is cylindrical in construction and which is composed of a number of concentric hollow cylinders.

Other objects and advantages of my invention will become apparent from the following description and the appended claims.

My invention generally comprises an inner cylindrical member and two transparent tubular members consisting of an outer member or cylinder and an intermediate member or cylinder concentrically arranged and coaxially aligned so that the three concentric cylinders may rotate about a common axis.

The inner cylinder may be opaque, and inscribed on its outer surface is a helical inscription or line that makes one complete revolution throughout the axial length of the cylinder and within the effective length of the numerical scales of the outer cylinder. The intermediate tubular member or hollow cylinder is preferably transparent and is provided with a helical inscription or line inscribed on its surface which is similar to the helical inscription or line inscribed on the inner cylinder. The outer cylinder has inscribed upon it spaced indicia comprising a logarithmic scale "L" and a uniform scale "U." The scales may be expanded to obtain greater accuracy without increasing the overall dimensions of the calculator by dividing the "L" and "U" scales into any desired number of sections of equal length and inscribing these sections on the surface of the outer cylinder parallel to the common axis of rotation, with their ends accurately aligned in planes perpendicular to the common axis of rotation and each section having the same effective length as the original "L" and "U" scales. The inner and intermediate cylinders are individually rotatable with respect to the outer cylinder and have a common axis of rotation. The cylinders are provided with suitable flanges, retainers, washers and retaining nut to insure proper relative position of the cylinders and to permit each to be rotated independently of the other and effecting a common axis of rotation. Means are provided for rotation of the inner and intermediate cylinders while the outer cylinder is held stationary.

For a better understanding of the invention, reference should be had to the accompanying drawing in which FIG. 1 is an exploded view in perspective;

FIG. 2 is an elevational view of the completed assembly;

FIG. 3 is a longitudinal sectional view through the center of the device shown in FIG. 2;

FIG. 4 is an enlarged view of the expanded scales that may be used with my device; and FIG. 5 is a fragmentary cross-sectional view of a further embodiment of my calculator.

In the drawings the numeral 10 designates my calculating device fully assembled.

The outer tubular cylinder 12 has knurled flanges 36 and 38 at opposite ends and inscribed upon its surface parallel to its longitudinal axis are scales "L" 14 and "U" 16. The intermediate tubular member 18 has a knurled flange 28 at one end and a helical line 20 inscribed on its lateral surface so that the length of the helical line makes one complete revolution along the surface of the tubular member 18, the effective length of which is determined by the length of scales 14 and 16 of the outer cylinder 12. The cylindrical members are made of a rigid, substantially unbreakable transparent material, such as polystyrene, "Teflon," polyvinyl acetate or other suitable materials that may be easily molded and are relatively inexpensive to manufacture. However, the inner cylindrical member may be opaque and may or may not be tubular.

The intermediate cylinder is fitted into the outer hollow cylinder 12. The bore of the outer cylinder is slightly larger than the outer diameter of the intermediate cylinder to facilitate rotational movement. The inner cylinder 22 has a knurled flange 26 at one end and a threaded end 30 at the opposite end. Inscribed upon its surface is helical line 24, similar to helical line 20 of cylinder 18. The bore of the intermediate cylinder is slightly larger than the outer diameter of the inner cylinder to facilitate rotational movement. The length of the dual "L" and "U" scales and the expanded "L" and "U" scales determines the effective length of the helical lines 20 and 24. On the threaded end 30 of the inner cylinder 22, a retaining nut 34 having a spring means 32 is screwed so that the spring means 32 is biased against the knurled flange 28. The spring 32 and nut 34 act as a backing means to hold the cylinders 18 and 22 in such manner that they may be rotated about a common axis individually or together and hold the cylindrical members in yielding relation to one another axially. In FIG. 5 36' is the knurled flange of the outer cylinder 12'. The intermediate cylinder 18' is fitted into the bore of the outer cylinder 12. Disposed at each end of the intermediate cylinder 18' are raised surfaces 46 and 50 in frictional contact with the bore of the outer cylinder. Also disposed at each end of cylinder 22' and fitted in frictional contact with the bore of the intermediate cylinder 18' are raised surfaces 50. The raised surface 50 which is adjacent to the knurled flange 26' forms a step as does one end of the intermediate cylinder 18', thus providing a space 48 between the outer surface of the intermediate cylinder 18' and the bore of the outer cylinder. Also, space 52 is formed between the outer surface of the inner cylinder 22' and the bore of the intermediate cylinder 18'.

The spaces 48 and 52 formed by the raised surfaces 46 and 50 limit the frictional contact between the three cylinders to the area of the raised surfaces 46 and 50, thus reduction of frictional surface facilitates rotational movement of all the cylinders. Another advantage is the elimination of wear that may occur due to friction on the surfaces that are in frictional contact.

In assembling my calculator, the intermediate member is fitted into the bore of the outer cylinder until the flange of the intermediate cylinder is biased against the flange of the outer cylinder. The inner cylinder is fitted into the bore of the intermediate cylinder until the flange of the inner cylinder is biased against the flange of the outer cylinder. Finally, the spring is biased against the flange of the intermediate cylinder, and the nut is screwed on the threaded end of the inner member to complete the assembly.

A transparent ring 40 containing a visible hair line 42 may be fitted over the outer cylinder 12 so that the ring 40 may slide axially along the outer cylinder 12. The hair line 42 lies in a plane perpendicular to the common axis. The movable ring 40 and hair line 42 are used to transfer readings from one scale to another, especially when the expanded scales are being used. It may also be used to perform the same functions that a hair line performs in conventional slide rules.

When the hair line 42 in ring 40 is not used, an axial line 44 may be used in place thereof which is inscribed parallel to the axis of rotation on the surface of the intermediate cylinder 18 and which performs the same function as the hair line 42 when transferring readings to the expanded scales. With regard to the use of the ring 40 having the hair line 42, it must be remembered that this arrangement is only necessary where the axial line 44 is not used or provided on my calculator.

For convenience I may color my helical lines. Thus, the inner cylinder has helical line 24 colored blue, and the intermediate cylinder has helical line 20 colored red.

Generally, when performing computations, the inner and outer cylinders are rotated about the common axis, while the outer cylinder is held stationary in such a manner that precise points on the blue and red lines will align themselves axially with desired points on the appropriate scale on the outer cylinder.

The method by which my calculator functions makes use of lines which are perpendicular to uniform and logarithmic scales. The outer hollow cylinder has inscribed on its surface suitable scales which can be used on my calculator in conjunction with the aforementioned helical lines which are inscribed on the inner and intermediate cylinders.

In FIGS. 1 and 2 I show the logarithmic scale "L" and the uniform scale "U" on the outer cylinder as they appear on my calculator. In FIG. 4 I show an enlarged view of the "L" and "U" scales expanded as they may appear on the outer cylinder of my calculator, and the $L_0$ and $U_0$ scales are the same as the "L" and "U" scales as shown in FIGS. 1 and 2.

To more clearly point out the principle of operation of my calculator, an example using fixed numbers and reference points in the figure below will show the mathematical principle by which a mathematical result may be obtained.

In the figure below, the lines OB and O'B' represent the helical lines inscribed on the intermediate and inner cylinders. OA represents the appropriate scale to be used and O'A' is an identical scale parallel to OA. Lines OA and O'A' may also be considered as imaginary longitudinal reference lines on the inner and intermediate cylinders, respectively. Therefore, by manipulating my calculator at fixed points along the uniform scale and the helical lines in accordance with my invention, the desired mathematical result is achieved.

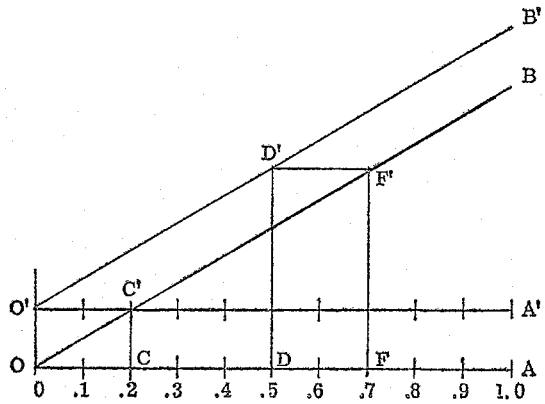

A uniform scale of numbers is laid out along the primary base OA with values ranging from 0 to 1.0. A perpendicular to OA is erected at station ".2" which intersects OB at point C'. The secondary base line O'A' is drawn parallel to OA, through point C' and the secondary oblique line O'B' is drawn parallel to oblique line OB.

A secondary ordinate DD' is erected at station ".5," intersecting O'B' at point D', and a horizontal line is drawn from D' intersecting OB at point F'. By constructing a perpendicular to OA, dropped from point F', the perpendicular will intersect OA at station ".7," indicating that $.2+.5=.7$.

The principle involved herein is graphical addition, the resultant being the desired result. The foregoing may be proved by well-known geometric principles by which it can be shown, for example, that $OC+OD=OF$.

The following examples illustrate the use of my calculator for performing addition, subtraction, multiplication and division.

EXAMPLE 1

In Example 1 I illustrate the use of my uniform scale to perform addition and subtraction.

A. *Addition*

(1) Divide all the individual numbers in the sum (mentally) by some power of ten such that the largest number is thereby reduced to a quantity less than unity.

| Example | Balance |
|---|---|
| $386 \div 1,000 = .386$ | .386 |
| $792 \div 1,000 = .792$ | 1.178 |
| $73 \div 1,000 = .073$ | 1.251 |

(2) Set the blue line on cylinder 22 at .386 on the "U" scale of cylinder 12.

(3) While maintaining the setting of cylinder 22, set the red line on cylinder 18 at zero on the "U" scale.

(4) Turn cylinders 22 and 18 in unison until the red line is at .792 on the "U" scale. The location of the blue line (at .178) on the "U" scale is partially indicative of the sum of .386 and .792, but this balance must be corrected by adding 1.000, since the cylinder 22 has now made more than one complete revolution, that is, the blue line has passed beyond the upper end of the "U" scale and reappeared at the left of the red line.

(5) Maintaining the blue line setting again, reset the red line at zero and then turn both cylinders 22 and 18 in unison until the red line is at .073 on the "U" scale. The blue line will now be at .251 on the scale, indicating—with the correcting addition of 1.000—that the sum of the three "adjusted" numbers is 1.251.

(6) Multiply the indicated sum, mentally, by the common factor by which the original numbers were reduced.

$1.251 \times 1000 = 1251$
1251 is the desired sum

B. *Subtraction*

This operation is carried out by a reverse of the method used for addition.

$647 \div 1000 = .647$
$-196 \div 1000 = -.196$ (1) Set up the blue line of cylinder 22 at .647 on the "U" scale.

(2) Maintaining the blue line setting, set the red line at .196 on the scale.

(3) Turn cylinders 22 and 18 in unison until the red line is at zero on the scale. The location of the blue line on the scale gives the result $.647 - .196 = .451$ (4) The mental operation $.451 \times 1000 = 451$ produces the desired answer.

EXAMPLE 2

In Example 2 I illustrate the use of my logarithmic scale to perform multiplication and division.

A. *Multiplication*

Example: $2.5 \times 30 \times .005$ (1) Set the blue line on cylinder 22 at 2.5 on the "L" scale.

(2) Holding the blue line setting, turn cylinder 18 until the red line is at 1.0 on the "L" scale.

(3) Turn cylinders 22 and 18 in unison until the red line is at 3.0 on the "L" scale. The blue line will now be at 7.5 on the scale, representing 75.0, the product of $2.5 \times 30$.

(4) Holding the blue line setting at 7.5, turn cylinder 18 until the red line is again at 1.0 on the "L" scale.

(5) Turn both cylinders in unison until the red line is at 5.0 (representing .005) on the scale. The blue line will now be at 3.75 on the scale, representing the actual product, .375.

B. *Division*

Division is carried out by the same process used for multiplication with the sequences reversed.

Example: $396 \div 3.6$ (1) Set the blue line of cylinder 22 at 3.96 on the "L" scale.

(2) Holding the blue line setting, turn cylinder 18 until the red line is at 3.6 on the "L" scale.

(3) Turn cylinders 22 and 18 in unison until the red line is at 1.0 on the "L" scale. The blue line setting will now be at 1.1 on the scale, representing the actual quotient, 110.

When my calculating device embodies the use of expanded scales, such as shown in FIG. 4, I may provide an axial line 44 inscribed on the surface of the transparent intermediate member 18. The axial line is parallel to the common axis of rotation and is at least as long as the expanded scale sections on the outer transparent tubular member. The use of the axial line will be described in the example set forth below.

EXAMPLE 3

In Example 3 I illustrate the use of the expanded logarithmic scales to perform multiplication using the axial line method.

To find the product of $1.7505 \times 38.62$—

A. First find the approximate answer by means of the $L_0$ scale:

(1) Set the blue helical line of the inner cylinder at 1.7505 (as nearly as possible) on the $L_0$ scale.
  (2) Maintaining the blue line setting, set the red helical line of the intermediate cylinder at 1.000 (the index) on the $L_0$ scale.
  (3) Turn the inner and intermediate cylinders in unison until the red line is at 3.862 (as nearly as possible) on the $L_0$ scale. The position of the blue line, at 6.76 on the $L_0$ scale, will now indicate that the actual product is approximately 67.6 and that the more precise answer is to be found on the expanded scale section $L_4$.

B. Using the expanded scale sections, obtain the more accurate answer as follows:

(1) Set the blue line of the inner cylinder at 1.7505 on the scale section $L_1$.
  (2) Maintaining the blue line setting, set the red helical line of the intermediate cylinder at the left-hand end of the $L_3$ scale section.
  (3) Turn both cylinders in unison until the red line is at 3.862 on the $L_3$ scale. The position of the blue line on the $L_3$ scale will now indicate an answer which, in this case, is erroneous. The blue line setting must be transferred from the $L_3$ scale to the $L_4$ scale. This is done by employing the axial line on the intermediate cylinder.

(4) Maintaining the blue line setting, turn the intermediate cylinder until the axial line on the intermediate cylinder coincides in position with the axial line of the $L_3$ scale.
  (5) Turn the inner and intermediate cylinders 22 and 18 in unison until the axial line on the intermediate cylinder coincides with the axial line of the $L_4$ scale. The intersection of the blue line with the $L_4$ scale will now indicate the approximate figure: 6.7604, which with the proper decimal adjustment, produces the more precise answer, 67.604.

It can readily be shown that by the proper use of the "transferring" function of the axial line on the intermediate cylinder, the $L_0$ scale and the expanded scale sections can be used in conjunction with the two helices to divide one number by another with a high degree of accuracy.

An alternative embodiment makes use of a movable, transparent cylindrical ring having clearly visible a hair line (or its equivalent) inscribed on the surface of the ring and lying in a plane perpendicular to the cylindrical axis. The ring provides another means for transferring readings from one scale to another.

For convenience and ease of manufacture, the ring may be split along one side (parallel to the cylindrical axis) and made with its inside diameter slightly smaller than the outside diameter of the outer cylinder of the calculator so that it must be expanded slightly upon assembly with the cylinder. This feature will result in a light friction force between ring and cylinder tending to hold the hair line in a fixed axial position and thus facilitating the operation of the calculator. For obvious reasons, the ring should be made of some transparent plastic having reasonably good elastic properties.

In the following example, the axial line on the intermediate cylinder is not needed, and the only transparent viewing area required for the outer cylinder scales is that provided with the $L_0$ scale.

EXAMPLE 4

In Example 4 I illustrate the use of the expanded logarithmic scales to perform multiplication using the hair line method.

Employing the same numerical example used for Example 3, the product of $1.7505 \times 38.62$ is found as follows:

A. The approximate answer is first found by the use of the $L_0$ scale as explained under Example 3.

B. Using the expanded scales and the sliding hair line, the more precise answer is found as follows:

(1) Set the sliding hair line at 1.7505 on scale section $L_1$.
  (2) Set the blue line of the inner cylinder in a position such that it intersects the spaced indicia of the $L_0$ scale at the same point where the hair line also intersects the spaced indicia.
  (3) Maintaining the blue line setting, shift the hair line axially until it is aligned with the number 3.862 on the $L_3$ scale, and turn the intermediate cylinder until its red helical line is at the left-hand end of the $L_0$ scale.
  (4) Turn the inner and intermediate cylinders in unison until the red line of the intermediate cylinder passes through the intersection of the hair line and the spaced indicia of the $L_0$ scale.
  (5) Since the approximate calculation indicated that the correct answer would be found on the $L_4$ scale, slide the hair line to the intersection of the blue helical line of the inner cylinder and the spaced indicia of the $L_0$ scale and read the figure 6.7604 at the intersection of the hair line with the spaced indicia of the $L_4$ scale. The correct, precise answer 67.604 is again obtained by shifting the decimal point.

Again, it can be shown that the sliding hair line can be used in conjunction with the $L_0$ scale, the expanded scales and the two helical lines to perform a precise division of one number by another.

Other types of scales may be added to this form of cylindrical slide rule to increase its utility and versatility. For example: By the addition of log. log. scales, the device may be employed to find various powers of numbers. This feature derives from the theory that if $y=x^n$, $$\log y = \log x^n = n(\log x)$$

and therefore $$\log(\log y) = \log n + \log(\log x)$$

Thus, a combination of a logarithmic scale (such as the $L_0$ scale) and a log. log. scale, used in conjunction with the two helical lines of this calculator, can be used to evaluate the function $y=x^n$ when the exponent $n$ is read on the $L_0$ scale, and the quantities $x$ and $y$ are located on the log. log. scale.

In short, this form of cylindrical slide rule may be adapted to any type of calculation performed with the conventional, linear slide rule.

It will be appreciated that modifications may be made in the illustrative embodiments and examples of my invention within the scope of the appended claims. Thus, other forms of cylindrical slide rules or calculators may be constructed without departing from the scope of my invention.

I claim:

1. A calculator including in combination a transparent outer tubular member having a bore extending therethrough and having inscribed spaced indicia, said spaced indicia being parallel to the axis of rotation; a transparent intermediate tubular member having a bore extending therethrough and rotatably disposed within the bore of the outer tubular member, said intermediate member having a helical inscription extending longitudinally and concentrically with respect to the axis; and an inner cylindrical member rotatably disposed within the bore of the intermediate tubular member, said inner member having a helical inscription extending longitudinally and concentrically with respect to the axis of said inner member; said helical inscriptions traversing one complete revolution longitudinally of said intermediate and inner members, wherein the length of said helical inscriptions determines the effective length of said spaced indicia, said inner and intermediate members having a flange disposed at one end thereof and said outer member having flanges disposed at each end thereof, said flanges serving to restrict longitudinal movement of said members and a threaded end disposed at an end of said inner member, said threaded end serving to receive a spring and a nut so that said calculator is disposed in fixed yielding position.

2. A calculator as set forth in claim 1 wherein the spaced indicia comprise a logarithmic scale and a uniform scale wherein said indicia of the uniform scale are equally spaced.

3. A calculator as set forth in claim 2 wherein said logarithmic scale and said uniform scale are expanded, having sections of equal length inscribed on the outer cylindrical member and corresponding in length to said helical inscriptions, and which is parallel to the common axis of rotation.

4. A calculator as set forth in claim 1 having a longitudinal axial line inscribed on said intermediate tubular member.

5. A calculator as set forth in claim 1 wherein a transparent ring is cooperatively mounted over the outer cylinder so that said ring is slidable longitudinally, and a visible hair line inscribed on said ring and perpendicular to the axis of rotation.

6. A calculator including in combination an inner cylindrical member, intermediate and outer transparent tubular members all of said members being concentrically arranged and coaxially aligned and rotatable about a common axis, said outer member having uniform and logarithmic scales in spaced relation to each other and formed parallel to the common axis of rotation and the other two members each being formed with a helical inscription thereon and extending longitudinally and concentrically with respect to the common axis, said helical inscriptions traversing one complete revolution longitudinally of said intermediate and inner members wherein the length of said helical inscriptions determine the effective length of said scales, means provided to restrict longitudinal movement of said members so that when said calculator is manipulated inaccuracies are prevented and said calculator functions to perform graphical addition of mathematical computations of multiplication, division, addition, subtraction and logarithmic functions.

7. A calculator as set forth in claim 6 wherein said means includes a pair of flanges disposed at each end of said outer cylindrical member, a flange disposed at one end of said intermediate and inner members and a threaded end disposed at an end of said inner member, said threaded end serving to receive a spring and nut so that said calculator is disposed in fixed yielding position.

8. A calculator as set forth in claim 7 wherein the flanges disposed at an end of said intermediate and inner members having raised surfaces thereon and said raised surfaces of said flanges frictionally engage the adjacent surfaces of said inner, intermediate and outer members.

References Cited in the file of this patent

UNITED STATES PATENTS

| | | |
|---|---|---|
| 813,485 | Coppage | Feb. 27, 1906 |
| 1,080,811 | Cowell | Dec. 9, 1913 |
| 1,600,214 | Butterfield | Sept. 21, 1926 |
| 2,451,842 | Liebmann et al. | Oct. 19, 1948 |
| 2,511,270 | Kahan | June 13, 1950 |

FOREIGN PATENTS

| | | |
|---|---|---|
| 778,556 | Great Britain | July 10, 1957 |